(12) United States Patent
Simoni et al.

(10) Patent No.: US 12,480,030 B2
(45) Date of Patent: Nov. 25, 2025

(54) VAPOR COMPRESSION SYSTEMS CONTAINING LUBRICANT-REFRIGERANT COMPOSITIONS

(71) Applicant: THE CHEMOURS COMPANY FC, LLC, Wilmington, DE (US)

(72) Inventors: Luke David Simoni, Wilmington, DE (US); Barbara Haviland Minor, The Villages, FL (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 47 days.

(21) Appl. No.: 18/266,318

(22) PCT Filed: Jan. 25, 2022

(86) PCT No.: PCT/US2022/013597
§ 371 (c)(1),
(2) Date: Jun. 9, 2023

(87) PCT Pub. No.: WO2022/164764
PCT Pub. Date: Aug. 4, 2022

(65) Prior Publication Data
US 2024/0132765 A1    Apr. 25, 2024

Related U.S. Application Data

(60) Provisional application No. 63/141,519, filed on Jan. 26, 2021.

(51) Int. Cl.
*C09K 5/04* (2006.01)
*C10M 105/38* (2006.01)
(Continued)

(52) U.S. Cl.
CPC .......... *C09K 5/045* (2013.01); *C10M 105/38* (2013.01); *C10M 171/008* (2013.01);
(Continued)

(58) Field of Classification Search
CPC .......................... C09K 5/045; C10M 171/008
See application file for complete search history.

(56) References Cited

U.S. PATENT DOCUMENTS 3,670,013 A * 6/1972 Leibfried ................ C07C 69/33
554/172
8,691,108 B2 * 4/2014 Matsuura .................. F25B 1/00
62/468

(Continued)

FOREIGN PATENT DOCUMENTS

JP    2011052032 A    3/2011
JP    2011094039 A    5/2011

OTHER PUBLICATIONS

AHRI Standard 700 with Addendum 1, 2017 Standard for Specifications for Refrigerants, AHRI Air-Conditioning, Heating & Refrigeration Institute, 2017, pp. 1-31, Arlington, VA 22201.
(Continued)

*Primary Examiner* — Christopher R Zerphey

(57) ABSTRACT

The present disclosure relates to refrigeration, air conditioning and heat pump apparatus containing a lubricating composition comprising polyol ester lubricant, tetrafluoropropene and difluoromethane.

14 Claims, 2 Drawing Sheets

(51) Int. Cl.
*C10M 171/00* (2006.01)
*F25B 31/00* (2006.01)
*C10N 20/02* (2006.01)
*C10N 40/30* (2006.01)

(52) U.S. Cl.
CPC ...... *F25B 31/002* (2013.01); *C09K 2205/122* (2013.01); *C09K 2205/126* (2013.01); *C09K 2205/22* (2013.01); *C10M 2207/2835* (2013.01); *C10N 2020/02* (2013.01); *C10N 2040/30* (2013.01)

(56) References Cited

U.S. PATENT DOCUMENTS

| | | | | |
|---|---|---|---|---|
| 9,540,556 | B2 * | 1/2017 | Minor | C10M 101/02 |
| 10,167,438 | B2 * | 1/2019 | Matsumoto | F04B 39/06 |
| 11,111,424 | B2 * | 9/2021 | Yana Motta | F25B 9/006 |
| 2007/0284555 | A1 | 12/2007 | Leck | |
| 2010/0117022 | A1 * | 5/2010 | Carr | C10M 105/44 |
| | | | | 508/501 |
| 2010/0122545 | A1 | 5/2010 | Minor | |
| 2012/0024007 | A1 | 2/2012 | Ota | |
| 2014/0097379 | A1 * | 4/2014 | Carr | C09K 5/045 |
| | | | | 252/68 |
| 2015/0008358 | A1 | 1/2015 | Okido | |

OTHER PUBLICATIONS

ASHRAE Standard 34-2019, Designation and Safety Classification of Refrigerants, ANSI/ASHRAE, 2019, pp. 1-18, Atlanta, GA.
ASTM E-681-09, Standard Test Method for Concentration Limits of Flammability of Chemicals (Vapors and Gases), 2015, pp. 1-12, ASTM International, West Conshohocken, PA.
PCT International Search Report and Written Opinion for Application No. PCT/US2022/013597 mailed Apr. 26, 2022.

* cited by examiner

VAPOR COMPRESSION SYSTEMS CONTAINING LUBRICANT-REFRIGERANT COMPOSITIONS

FIELD OF THE INVENTION

The present invention relates to refrigeration, air conditioning and heat pump systems for use with refrigerants containing tetrafluoropropene and difluoromethane and polyol ester lubricants.

BACKGROUND OF THE INVENTION

The refrigerants industry has been in search of refrigerants that do not negatively impact the environment in terms of ozone depletion and global warming. Many refrigerants and refrigerant blends have been suggested as low global warming and low to zero ozone depletion.

The conventional lubricants may be useful with these new compositions, but it is necessary to understand solubility behavior of such refrigerants and blends in order to ensure proper functioning of these systems. Therefore, studies of refrigerant mixtures with lubricants are needed.

SUMMARY OF THE INVENTION

Provided herein is a refrigeration, air-conditioning or heat pump apparatus comprising an evaporator, a compressor, a condenser, and an expansion device; wherein said compressor comprises a lubricant reservoir containing a lubricating composition comprising polyol ester lubricant, difluoromethane, and 2,3,3,3-tetrafluoropropene.

Also provided herein is a method of lubricating a compressor in a refrigeration, air conditioning or heat pump system, said method comprising adding a POE lubricant to the compressor, charging the system with refrigerant and operating the system, wherein said compressor comprises a lubricant reservoir and wherein said refrigerant contains difluoromethane and 2,3,3,3-tetrafluoropropene.

Also provided herein are compositions and methods for cooling and heating with refrigeration, air-conditioning or heat pump apparatus as described herein.

DETAILED DESCRIPTION

Figure 1:
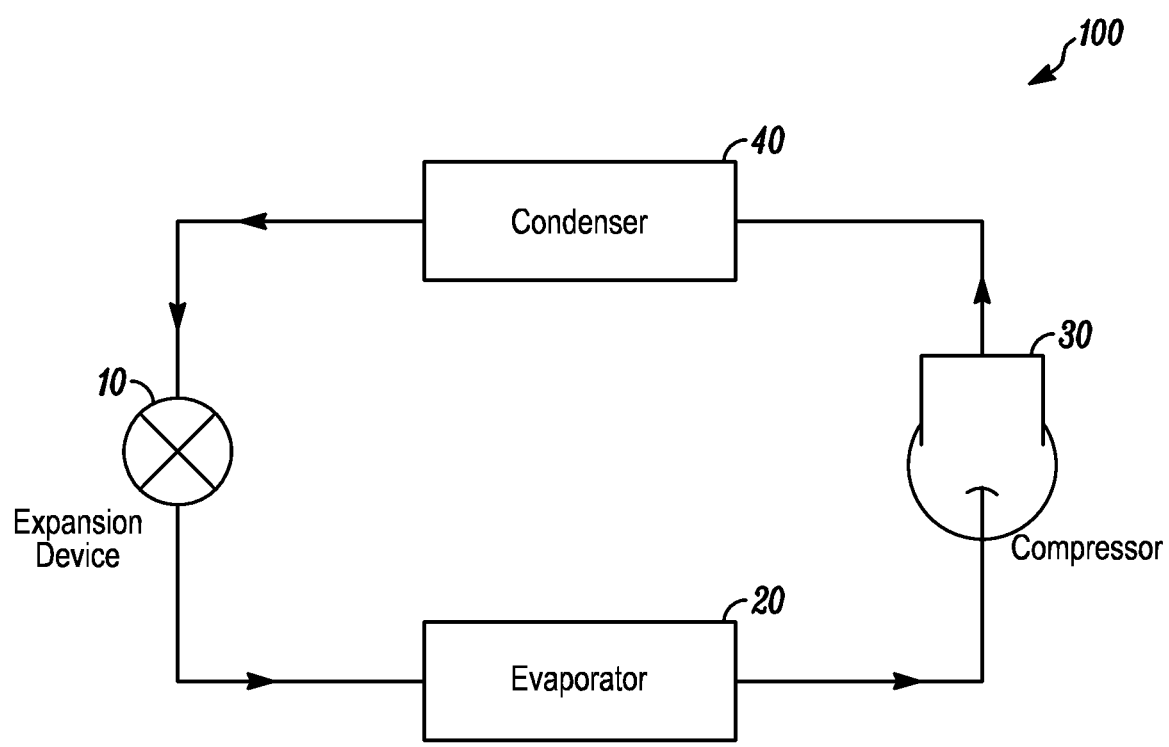
FIG. 1 is a diagram of one embodiment of the main components of the apparatus of the present invention.

It has been surprisingly found that the solubility of different refrigerants, e.g. 2,3,3,3-tetrafluoropropene and difluoromethane, in lubricants is not the same. Thus, when refrigerant blends of a particular composition are solubilized in the lubricant, the composition of the refrigerant dissolved in the lubricant phase does not necessarily correspond to the refrigerant blend as originally formulated.

Definitions

A refrigerant is defined as a heat transfer fluid that undergoes a phase change from liquid to gas and back again during a cycle used to transfer of heat.

A refrigeration system is the system (or apparatus) used to produce a heating or cooling effect in a particular space. A heat transfer or refrigeration system may be a mobile system or a stationary system.

Examples of refrigeration systems are any type of refrigeration systems and air conditioning systems including, but not limited to, stationary heat transfer systems, air conditioners, freezers, refrigerators, heat pumps, water chillers, flooded evaporator chillers, direct expansion chillers, walk-in coolers, mobile or transport refrigeration systems, mobile heat transfer systems, mobile air conditioning units, mobile heat pumps, including automobile heat pumps for cooling and heating of a vehicle passenger compartment, dehumidifiers, and combinations thereof.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

The net refrigeration effect is the quantity of heat that each kilogram of refrigerant absorbs in the evaporator to produce useful cooling.

The mass flow rate is the quantity of refrigerant in kilograms circulating through the refrigeration, heat pump or air conditioning system over a given period of time.

As used herein, the term "lubricant" or "oil" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. Determination of whether a refrigerant compound or mixture is flammable or non-flammable is also done by testing under the conditions of ASTM-E681.

During a refrigerant leak, lower boiling components of a mixture may leak preferentially. Thus, the composition in the system, as well as, the vapor leaking can vary over the time period of the leak. Thus, a non-flammable mixture may become flammable under leakage scenarios. And in order to be classified as non-flammable by ASHRAE (American Society of Heating, Refrigeration and Air-conditioning Engineers), a refrigerant or heat transfer composition must be non-flammable as formulated, but also under leakage conditions. ASHRAE defines different flammability classifications. Class 1 refrigerants do not propagate a flame. Class 3 refrigerants have higher flammability and Class 2 refrigerants are called flammable. Class 2L refrigerants are lower flammability, with a burning velocity$\leq$10 cm/sec.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine or other ozone depleting halogens.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R-32) is commercially available or may be made by methods known in the art, such as by dechlorofluorination of methylene chloride.

Apparatus

Disclosed herein is a refrigeration, air-conditioning or heat pump apparatus comprising an evaporator, a compressor, a condenser, and an expansion device; wherein said compressor comprises a lubricant reservoir containing a lubricating composition comprising polyol ester lubricant, difluoromethane, and 2,3,3,3-tetrafluoropropene. FIG. 1 is a diagram of one embodiment of the present apparatus 100, indicating position of the evaporator 20, compressor 30, condenser 40 and expansion device 10.

The compressors of the present refrigeration, air-conditioning or heat pump apparatus may be any compressor designed for use in refrigeration, air-conditioning or heat pump systems that may serve to compress or raise the pressure of refrigerant gases prior to condensation of the gases.

In some embodiments, the compressors in the apparatus, may include but are not limited to rotary compressors, reciprocating compressors and scroll compressors. Additionally, the compressors may be hermetic or semi-hermetic compressors. In particular, the compressors may have a lubricant reservoir to contain excess lubricant to prevent seizure of the moving components.

Figure 2:
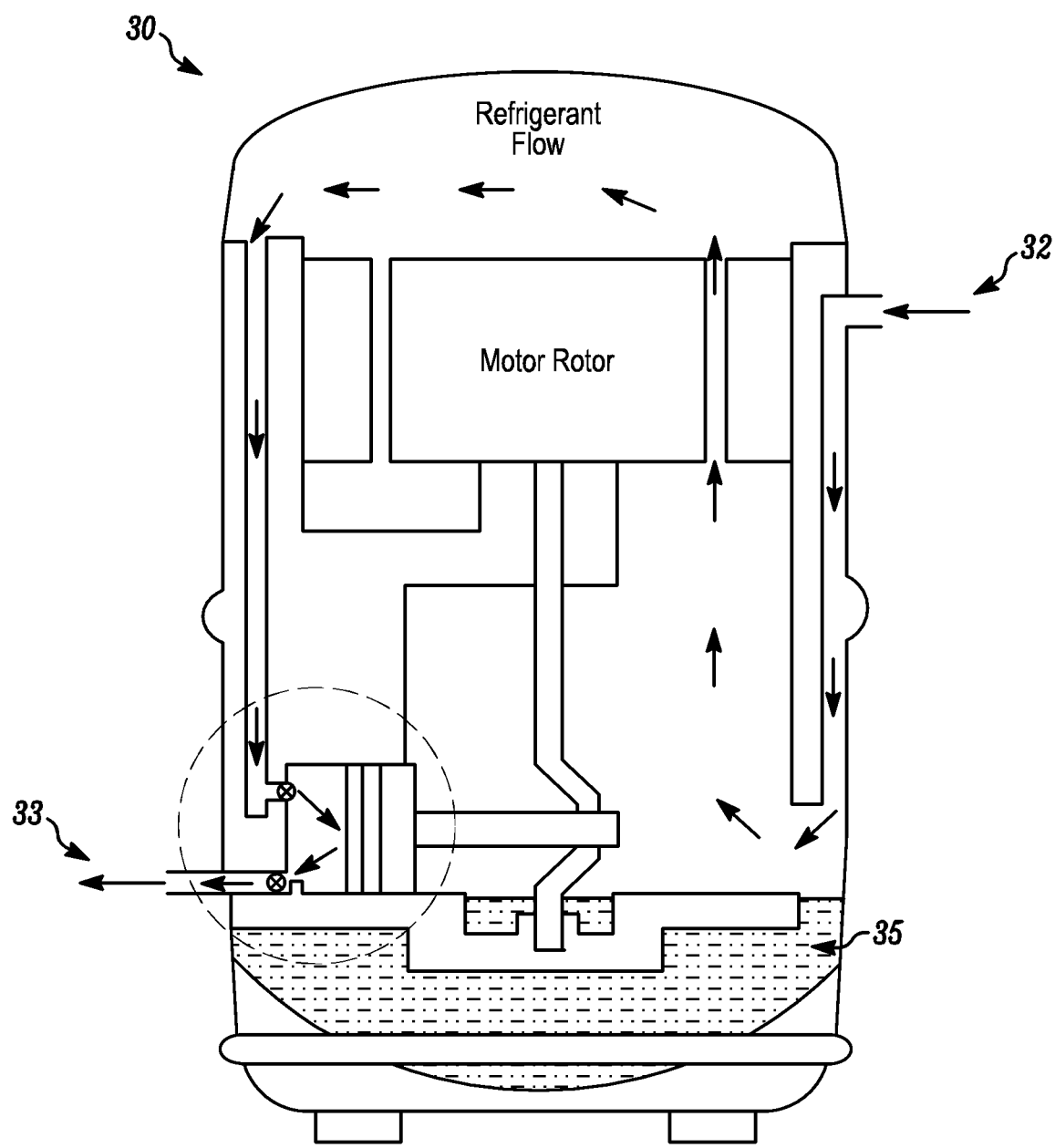
FIG. 2 is a diagram of one embodiment of a compressor indicating the location of the lubricant reservoir (or oil sump).

With reference to FIG. 2, a diagram of one embodiment of a compressor 30, indicating the flow of refrigerant through the compressor and the location of the oil sump 35. In this embodiment the lower portion of the compressor serves as a reservoir for excess lubricant. The composition in the oil sump or lubricant reservoir 35 is comprised of polyol ester lubricant, HFO-1234yf and HFC-32. The refrigerant gas flows into the compressor as a low temperature low pressure vapor at the compressor intake 32. The refrigerant gas is compressed in the compressor leaving the compressor as high temperature high pressure vapor at the compressor discharge 33.

The vapor compression cycle of the inventive apparatus may be used to provide air conditioning, refrigeration, freezing or heating. The apparatus comprises at least an evaporator, a compressor, a condenser and an expansion device, as well as transport lines for the refrigerant vapor or heat transfer fluid between each element. The evaporator and the condenser comprise a heat exchanger allowing an exchange of heat between the refrigerant or heat transfer fluid and another fluid or body.

The evaporator used in the apparatus can be an expansion evaporator or a flooded evaporator. And the evaporator may operate in co-current mode (wherein the two flows are perpendicular to the other) or counter-current mode (wherein the two flows are parallel, but in the opposite direction from the other). Additionally, the evaporator may operate in co-current mode with counter-current tendency, thus providing some of the benefit realized by counter-current heat exchange.

The condenser may also operate in co-current mode, counter-current mode or co-current mode with countercurrent tendency, just as the evaporator.

Internal heat exchangers may be used as a method to improve the overall efficiency of heat transfer by the apparatus. Additionally, other known methods of improving efficiency can be included in the inventive apparatus.

Polyol Ester Lubricants

The lubricants of the present invention include polyol ester (POE) lubricants or oils. POE lubricants are typically formed by a chemical reaction (esterification) of a carboxylic acid, or a mixture of carboxylic acids, with an alcohol, or mixture of alcohols. Water formed during this reaction is eliminated to avoid the reverse reaction (i.e. hydrolysis).

The carboxylic acids are typically mono-functional, di-functional or polyfunctional acids. The carboxylic acids are typically polyfunctional acids. Examples of carboxylic acids include, but are not limited to ethylhexanoic acid, including 2-ethyl hexanoic acid, trimethyl hexanoic acid, including 3,5,5-trimethyl hexanoic acid, octanoic acid, including linear octanoic acid, pentanoic acid, including n-pentanoic acid, neo acids, including dimethylpentanoic acid, C5 to C20 carboxylic acids and mixtures thereof. The carboxylic acids may also be derived from natural sources including, but not limited to plant and vegetable oils of soybean, palm, olive, rapeseed, cottonseed, coconut, palm kernel, corn, castor, sesame, jojoba, peanut, sunflower, others, and mixtures thereof. Natural oil carboxylic acids are typically C18 acids, but also include C12-C20 acids among others.

The alcohols can be mono-functional, difunctional or polyfunctional alcohols. Polyfunctional alcohols or polyols contain 2 or more hydroxyl groups. The polyols are typically di- tri- or tetra-functional. Examples of polyols include but are not limited to neopentyl glycol, glycerin, trimethylolpropane, pentaerythritol, and mixtures thereof.

In one embodiment, the POE lubricant is formulated using one or more mono-functional carboxylic acids with one or more polyols. In another embodiment the POE lubricant is formulated using one or more di-functional carboxylic acids with one or more mono-functional alcohols. In another embodiment, the POE lubricant is formulated using a mixture of different POE lubricants. In another embodiment, the POE lubricant is formulated using one or more C5-C10 carboxylic acids.

In a preferred embodiment, the polyols are preferably those having a neopentyl backbone, preferably neopentyl glycol, trimethylol propane, pentaerythritol, dipentaerylthritol, and mixtures thereof. Most preferably, the polyol has a pentaerythritol backbone.

In a preferred embodiment, the carboxylic acids preferably contain 2 to 15 carbons. In another embodiment, the carbon backbone is preferably linear or branched. Examples of preferred carboxylic acids include, but are not limited to, n-pentanoic acid, n-hexanoic acid, n-heptanoic acid, n-octanoic acid, adipic acid, succinic acid, and mixtures thereof.

Some alcohol functions may not be esterified in the reaction, though the quantity of which is typically small. Thus, the POE may include between zero and 5 percent by mole of —CH$_2$OH groups relative to —CH$_2$—O—(C=O)— groups.

Additional POE lubricants include those of formula (I):

$$R^1[OC(O)R^2]_n \quad \quad (I)$$

wherein:
$R^1$ is a linear or branched hydrocarbon substituent, optionally substituted by at least one hydroxyl group and/or comprising at least one heteroatom chosen from the group consisting of —O—, —N—, and —S—;
Each $R^2$ is, independently of each other, chosen from the group consisting of: i)
   ii) an aliphatic hydrocarbon substituent;
   iii) a branched hydrocarbon substituent;
   iv) a mixture of a substituent ii) and/or iii), with an aliphatic hydrocarbon substituent comprising from 8 to 14 carbon atoms; and
n is an integer of at least 2.

In the context of the invention, a hydrocarbon substituent refers to a substituent consisting of carbon and hydrogen atoms.

In one embodiment, the polyols have the general formula (II):

$$R^1(OH)_n \quad \quad (II)$$

wherein:
$R^1$ is a linear or branched hydrocarbon substituent, optionally substituted by at least one hydroxyl group, preferably by two hydroxyl groups, and/or comprising at least one heteroatom chosen from the group consisting of —O—, —N—, and —S—; and n is an integer of at least 2.

In one embodiment, $R^1$ represents a linear or branched hydrocarbon substituent comprising from 4 to 40 carbon atoms and preferably from 4 to 20 carbon atoms.

In another embodiment, $R^1$ is a linear or branched hydrocarbon substituent comprising at least one oxygen atom.

In another embodiment, $R^1$ is a branched hydrocarbon substituent comprising from 4 to 10 carbon atoms, preferably from 5 carbon atoms, substituted by at least one oxygen atom.

In one embodiment, the polyols comprise from 2 to 10 hydroxyl groups, preferably from 2 to 6 hydroxyl groups.

In another embodiment, the polyols may comprise one or more oxyalkylene groups, such as for instance, polyether polyols.

In another embodiment, the polyols are preferably selected from the group consisting of ethylene glycol, diethylene glycol, triethylene glycol, propylene glycol, dipropylene glycol, glycerol, neopentyl glycol, 1,2-butanediol, 1,4-butanediol, 1,3-butanediol, pentaerytritol, dipentaerythritol, tripentaerythritol, triglycerol, trimethylolpropane, sorbitol, hexaglycerol, and mixtures thereof. In another embodiment, the polyol is preferably pentaerytritol or dipentaerythritol.

In one embodiment, the carboxylic acids may be represented by general formula (III):

$$R^2COOH \quad (III)$$

wherein:
$R^2$ is selected from the group consisting of:
i) H;
ii) an aliphatic hydrocarbon substituent;
iii) a branched hydrocarbon substituent;
iv) a mixture of a substituent ii) and/or iii), with an aliphatic hydrocarbon substituent comprising from 8 to 14 carbon atoms; and
n is an integer of at least 2.

In certain embodiments, $R^2$ is an aliphatic hydrocarbon substituent with 1 to 10, from 1 to 7, and, in particular, from 1 to 6 carbon atoms.

In some embodiments, $R^2$ is a branched hydrocarbon substituent having 4 to 20 carbon atoms, from 5 to 14 carbon atoms, or having 6 to 8 carbon atoms.

In one embodiment of the present invention, a branched hydrocarbon substituent has the following general formula (IV):

$$-C(R^3)(R^4)(R^5) \quad (IV)$$

wherein:
$R^3$, $R^4$, and $R^5$ are independent of one another, an alkyl group, and at least one of the alkyl groups contains at least two carbon atoms. Such branched alkyl groups, once linked to the carboxyl group, are known under the name "neo-group", and the corresponding acid as "neo-acid". In one embodiment, $R^3$ and $R^4$ are methyl groups and $R^5$ is an alkyl group comprising at least two carbon atoms.

In one embodiment, the substituent $R^2$ can comprise one or more carboxyl groups, or ester groups such as —COOR$^6$, with R$^6$ representing an alkyl, hydroxyalkyl or hydroxyalkyloxy alkyl group.

Preferably, the $R^2$ COOH acid with formula (III) is a monocarboxylic acid.

Examples of carboxylic acids in which the hydrocarbon substituent is aliphatic are, in particular, formic acid, acetic acid, propionic acid, butyric acid, pentanoic acid, hexanoic acid and heptanoic acid. Examples of carboxylic acids in which the hydrocarbon substituent is branched are in particular, 2-ethyl-n-butyric acid, 2-hexyldecanoic acid, isostearic acid, 2-methyl-hexanoic acid, 2-methylbutanoic acid, 3-methylbutanoic acid, 3,5,5-trimethylhexanoic acid, 2-ethylhexanoic acid, neoheptanoic acid, and neodecanoic acid.

The third type of carboxylic acids that can be used in the preparation of polyol esters with formula (I) are carboxylic acids comprising an aliphatic hydrocarbon substituent comprising from 8 to 14 carbon atoms. Examples include, decanoic acid, dodecanoic acid, lauric acid, stearic acid, myristic acid, behenic acid, etc. Dicarboxylic acids include maleic acid, succinic acid, adipic acid, sebacic acid, etc.

According to one preferred embodiment, the carboxylic acids used to prepare the polyol esters of formula (I) comprise a mixture of monocarboxylic and dicarboxylic acids, the proportion of monocarboxylic acids making up the majority. The presence of dicarboxylic acids in particular results in the formation of polyol esters with a higher viscosity.

In particular, the formation reaction of the polyol esters with formula (I) by reaction between the carboxylic acid and the polyols is a reaction catalyzed by an acid. It is in particular a reversible reaction, which can be completed by the use of a large quantity of acid or by the elimination of the water formed during the reaction.

The esterification reaction can be done in the presence of organic or inorganic acids, such as sulfuric acid, phosphoric acid, etc. In some embodiments, the reaction is done in the absence of any catalyst.

The quantity of carboxylic acid and polyol can vary in the mixture depending on the desired results. In the specific case where all of the hydroxyl groups are esterified, a sufficient quantity of carboxylic acid must be added to react with all of the hydroxyls.

According to one embodiment, during the use of carboxylic acid mixtures, the latter can react sequentially with the polyols. According to another embodiment, during the use of mixtures of carboxylic acids, a polyol reacts first with a carboxylic acid, typically the carboxylic acid with the highest molecular weight, followed by the reaction with the carboxylic acid having an aliphatic hydrocarbon chain.

According to one embodiment, the esters can be formed by reaction between the carboxylic acids (or their anhydride or ester derivatives) with the polyols, in the presence of acids at high temperature, while removing the water formed during the reaction. Typically, the reaction can be done at a temperature of 75 to 200° C.

According to one preferred embodiment, the polyol esters are obtained from pentaerythritol alcohol, and a mixture of carboxylic acids: isononanoic acid, at least one acid having an aliphatic hydrocarbon substituent of 8 to 10 carbon atoms, and heptanoic acid. The preferred polyol esters are obtained from pentaerythritol, and a mixture of 70% isononanoic acid, at least 15% of at least one carboxylic acid having an aliphatic hydrocarbon substituent of 8 to 10 carbon atoms, and 15% heptanoic acid. One example is the Solest 68 oil marketed by CPI Engineering Services Inc.

According to one preferred embodiment, the polyol esters are obtained from dipentaerythritol alcohol, and a mixture of carboxylic acids: isononanoic acid, at least one acid having an aliphatic hydrocarbon substituent of 8 to 10 carbon atoms, and heptanoic acid. Preferably, the polyol esters of the invention have one of the following formulas (I-A) or (I-B):

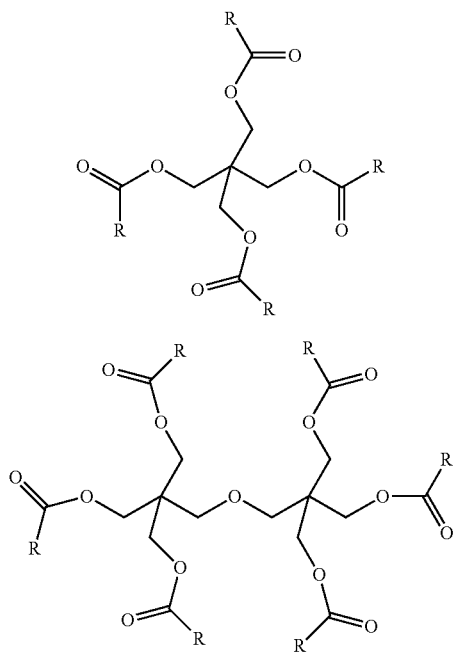

wherein each R represents, independently:
  a) an aliphatic hydrocarbon substituent comprising from 1 to 10 carbon atoms, from 2 to 9 carbon atoms, or from 4 to 9 carbon atoms, or from 1 to 6 carbon atoms; or
  b) a branched hydrocarbon substituent comprising from 4 to 20 carbon atoms, from 4 to 14 carbon atoms, or from 4 to 9 carbon atoms.

In particular, the polyol esters of formula (I-A) or formula (I-B) comprise different substituents R.

According to another embodiment, the polyol esters of the invention comprise at least one ester of one or more branched carboxylic acids comprising no more than 8 carbon atoms. The ester is in particular obtained by reacting said branched carboxylic acid with one or more polyols.

According to one preferred embodiment, the branched carboxylic acid is chosen from among 2-methylbutanoic acid, 3-methylbutanoic acid, and mixtures thereof.

According to one preferred embodiment, the polyol is chosen from the group constituted of neopentyl glycol, glycerol, trimethylol propane, pentaerythritol, dipentaerythritol, tripentaerythritol, and mixtures thereof.

According to one preferred embodiment, the polyol esters are obtained from:
  i) a carboxylic acid chosen from among 2-methylbutanoic acid, 3-methylbutanoic acid, and mixtures thereof; and
  ii) a polyol chosen from the group constituted of neopentyl glycol, glycerol, trimethylol propane, pentaerythritol, dipentaerythritol, tripentaerythritol, and mixtures thereof.

According to another embodiment, the polyol esters according to the invention are poly(neopentylpolyol) esters obtained by:
  i) reacting a neopentylpolyol having the following formula (V):

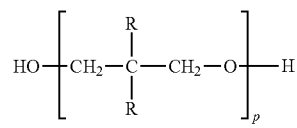

wherein:
  each R represents, independently of each other, $CH_3$, $C_2H_5$ or $CH_2OH$;
  p is an integer ranging from 1 to 4;
  with at least one monocarboxylic acid having 2 to 15 carbon atoms, and in the presence of an acid catalyst, the molar ratio between the carboxyl groups and the hydroxyl groups being less than 1:1, to form a partially esterified poly(neopentyl)polyol composition; and
  ii) reacting the partially esterified poly(neopentyl) polyol composition obtained at the end of step i), with another carboxylic acid having 2 to 15 carbon atoms, to form the final composition of poly(neopentylpoly) ester(s). Preferably, the reaction i) is done with a molar ratio of 1:4 to 1:2.

Preferably, the neopentyl polyol has the following formula (VI):

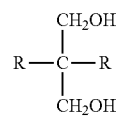

in which each R represents, independently of one another, $CH_3$, $C_2H_5$ or $CH_2OH$.

Preferred neopentyl polyols are those chosen from among pentaerythritol, dipentaerythritol, tripentaerythritol, tetraerythritol, trimethylolpropane, trimethylolethane, and neopentyl glycol. In particular, the neopentylpolyol is pentaerythritol.

Preferably, a single neopentyl polyol is used to produce the POE-based lubricant. In some cases, two or more neopentyl polyols are used. This is in particular the case when a commercial pentaerythritol product comprises small quantities of dipentaerythritol, tripentaerythritol, and tetraerythritol.

The monocarboxylic acids in particular have the following general formula (VII):

 (VII)

wherein R' is a linear or branched C1-C12 alkyl substituent, a C6-C12 aryl substituent, a C6-C30 aralkyl substituent. Preferably, R' is a C4-C10, and preferably C5-C9, alkyl substituent.

In particular, the monocarboxylic acid is chosen from the group constituted of butanoic acid, pentanoic acid, hexanoic acid, heptanoic acid, n-octanoic acid, n-nonanoic acid, n-decanoic acid, 3-methylbutanoic acid, 2-methylbutanoic acid, 2,4-dimethylpentanoic acid, 2-ethylhexanoic acid, 3,3,5-trimethylhexanoic acid, benzoic acid, and mixtures thereof.

According to one preferred embodiment, the monocarboxylic acid is n-heptanoic acid, or a mixture of n-heptanoic acid with another linear monocarboxylic acid, in particular n-octanoic acid and/or n-decanoic acid.

According to another embodiment, the polyol esters according to the invention satisfy the following formula (VIII):

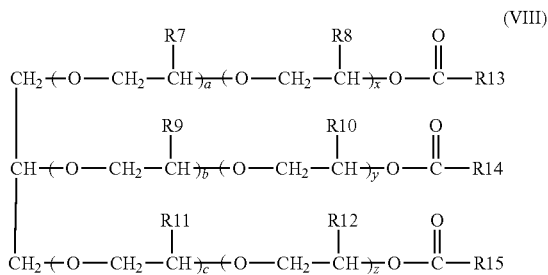

wherein:
$R^7$, $R^8$, $R^9$, $R^{10}$, $R^{11}$ and $R^{12}$ are, independently of one another, H or $CH_3$,
a, b, c, y, x and z, are, independently of one another, an integer;
a+x, b+y, and c+z are, independently of one another, integers from 1 to 20;
$R^{13}$, $R^{14}$ and $R^{15}$ are, independently of one another, chosen from the group constituted of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryl and cycloalkylarylalkyls,
$R^{13}$, $R^{14}$ and $R^{15}$, having from 1 to 17 carbon atoms, and optionally being able to be substituted.

According to another embodiment, the polyol esters according to the invention have the following formula (IX):

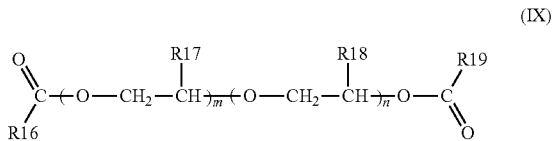

wherein:
each of $R^{17}$ and $R^{18}$ is, independently of one another, H or $CH_3$,
each of m and n is, independently of each other, an integer, where m+n is an integer ranging from 1 to 10;
$R^{16}$ and $R^{19}$ are, independently of one another, chosen from the group constituted of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryl and cycloalkylarylalkyls,
$R^{16}$ and $R^{19}$, having from 1 to 17 carbon atoms, and optionally being able to be substituted.

Polyol ester lubricants may be used in combination with other lubricants, including, but not limited to lubricants or oils selected from the group consisting of mineral oils, silicone oils, natural paraffins, naphthenes, synthetic paraffins, alkylbenzenes, poly-alpha olefins, poly-alkene glycols, polyvinyl ethers, and mixtures thereof.

In one embodiment, the POE lubricants may have viscosity at about 40° C. of from about 1 to 1000 centistokes (cSt), or from about 10 to 200 cSt, or from about 15 to 100 cSt, or from about 30 to 80 cSt, or from about 32 to 68 cSt. Typical, viscosity for POE lubricants as described herein is from about 32 to 68 cSt. at about 40° C.

Refrigerant

Refrigerant blends include mixtures of refrigerants, including HFO-1234yf and HFC-32. Refrigerant blends R-454A, R-454B, and R-454C are mixtures of HFO-1234yf and HFC-32 in specific ratios as defined by the American Society of Heating, Refrigerating and Air-Conditioning Engineers, Inc. (ASHRAE) in ASHRAE Standard 34-2019. R-454A is a blend of 65 weight percent HFO-1234yf, ±2.0 weight percent and 35 weight percent HFC-32, ±2.0 weight percent. R-454B is a blend of 31.1 weight percent HFO-1234yf, ±1.0 weight percent and 68.9 weight percent HFC-32, ±1.0 weight percent. R-454C is a blend of 78.5 weight percent HFO-1234yf, ±2.0 weight percent and 21.5 weight percent HFC-32, ±2.0 weight percent.

The refrigerant blends may be prepared by any convenient method to combine the desired amounts of the individual components. A preferred method is to weight the desired component amounts and thereafter combine the components in an appropriate vessel. Agitation may be used, if desired.

Additionally, the refrigerant blends as described above can be prepared using newly produced or recycled components. The method for making a refrigerant blend composition may comprise:
i) recovering HFC-32, HFO-1234yf or both from a refrigerant container, such as a storage container, or existing heat transfer system;
ii) removing impurities sufficiently to enable reuse of said HFC-32, HFO-1234yf or both;
iii) and optionally combining all or part of said reclaimed volume of HFC-32, HFO-1234yf or both to produce a composition as described herein.

The impurities to be removed may include water, non-condensable gases, such as air, oxygen, nitrogen, carbon dioxide or other gases, residual lubricant or oil, other organic components produced due to decomposition of either or both components, solids or other residue possibly present due to corrosion or breakdown of metal or elastomer degradation in the original system from which the refrigerant is recovered. The recovered components may be cleaned to the extent that they meet the requirements of "AHRI Standard 700-2017 for Specifications for Fluorocarbon Refrigerants", from the Air-conditioning, Heating and Refrigeration Institute (AHRI). Generally, these standards require less than 1.5 volume percent non-condensable gases, including air, oxygen, nitrogen, etc.; 10 ppm by weight or less of water; 0.5 weight percent other volatile impurities; and high boiling residue of no more than 0.01 weight or volume percent; among other requirements.

In one embodiment, the refrigeration, air-conditioning or heat pump apparatus comprising an evaporator, a compressor, a condenser, and an expansion device; wherein said compressor comprises a lubricant reservoir containing a lubricating composition comprising polyol ester lubricant, difluoromethane, and 2,3,3,3-tetrafluoropropene. The lubricating composition may comprise from about 2 to 7 weight percent difluoromethane, about 6 to 18 weight percent 2,3,3,3-tetrafluoropropene, and about 75 to 91 weight percent polyol ester lubricant. In another embodiment, the lubricating composition may comprise from about 5 to 14 weight percent difluoromethane, about 3 to 9 weight percent 2,3,3,3-tetrafluoropropene, and about 76 to 92 weight percent polyol ester lubricant. In another embodiment, the lubricating composition may comprise from about 1 to 4 weight percent difluoromethane, about 7 to 20 weight percent 2,3,3,3-tetrafluoropropene, and about 77 to 92 weight percent polyol ester lubricant.

In one embodiment, the lubricating composition may comprise from about 2 to 6.5 weight percent difluoromethane, about 6 to 17 weight percent 2,3,3,3-tetrafluoropropene, and about 77 to 91 weight percent polyol ester lubricant. In another embodiment, the lubricating composition may comprise from about 5 to 13 weight percent difluoromethane, about 3 to 8 weight percent 2,3,3,3-tetrafluoropropene, and about 80 to 92 weight percent polyol ester lubricant. In another embodiment, the lubricating composition comprises from about 2 to 4 weight percent difluoromethane, about 7 to 19 weight percent 2,3,3,3-tetrafluoropropene, and about 78 to 92 weight percent polyol ester lubricant.

In one embodiment, the lubricating composition comprises from about 3 to 6.5 weight percent difluoromethane, about 8 to 17 weight percent 2,3,3,3-tetrafluoropropene, and about 77 to 88 weight percent polyol ester lubricant. In another embodiment, the lubricating composition comprises from about 7 to 13 weight percent difluoromethane, about 3 to 8 weight percent 2,3,3,3-tetrafluoropropene, and about 80 to 89 weight percent polyol ester lubricant. In another embodiment, the lubricating composition comprises from about 3 to 4 weight percent difluoromethane, about 9 to 19 weight percent 2,3,3,3-tetrafluoropropene, and about 78 to 89 weight percent polyol ester lubricant.

In one embodiment, the lubricating composition comprises from about 6 to 7 weight percent difluoromethane, about 6 to 18 weight percent 2,3,3,3-tetrafluoropropene, and about 75 to 78 weight percent polyol ester lubricant. In another embodiment, the lubricating composition comprises from about 7 to 9 weight percent difluoromethane, about 7 to 9 weight percent 2,3,3,3-tetrafluoropropene, and about 76 to 81 weight percent polyol ester lubricant. In another embodiment, the lubricating composition comprises from about 1 to 4 weight percent difluoromethane, about 18 to 20 weight percent 2,3,3,3-tetrafluoropropene, and about 77 to 79 weight percent polyol ester lubricant.

In some embodiments, in addition to the lubricating composition containing POE, HFO-1234yf, and HFC-32, the disclosed compositions may comprise optional additional components. Thus, disclosed herein are compositions comprising a lubricating composition containing POE, HFO-1234yf, and HFC-32, further comprising one or more optional additional components selected from the group consisting of dyes (including UV dyes), solubilizing agents, compatibilizers, stabilizers, polymerization inhibitors, tracers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. In some embodiments, the optional additional components may be referred to as additives. Indeed, many of these optional additional components fit into one or more of these categories and may have qualities that lend themselves to achieve one or more performance characteristic.

In some embodiments, one or more additional components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

The additional components used with the lubricating compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

Another additional component which may be used with the lubricating compositions of the present invention may include at least one solubilizing agent selected to improve the solubility of one or more dye(s) in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the additional component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propanes, including propylene and propane, butanes, including n-butane and isobutene, pentanes, including n-pentane, isopentane, neopentane and cyclopentane, hexanes, octanes, nonane, and decanes, among others.

Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2\!=\!C(R^1)CO_2R^2$, $CH_2\!=\!C(R^3)C_6H_4R^4$, and $CH_2\!=\!C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, DE, 19898, USA) under the trademark Zonyl® ® PHS. Zonyl® PHS is a random copolymer made by polymerizing 40 weight percent $CH_2\!=\!C(CH_3)CO_2CH_2CH_2(CF_2CF_2)_mF$ (also referred to as Zonyl®® fluoromethacrylate or ZFM) wherein m is from 1 to 12, primarily 2 to 8, and 60 weight percent lauryl methacrylate ($CH_2\!=\!C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another optional additional component which may be used with the compositions of the present invention may be a metal surface deactivator. The metal surface deactivator is selected from the group consisting of areoxalyl bis (benzylidene) hydrazide; N,N'-bis(3,5-di-tert-butyl-4-hydroxyhydrocinnamoylhydrazine; 2,2,'-oxamidobis-ethyl-(3,5-di-tert-butyl-4-hydroxyhydrocinnamate, N,N'-(disalicyclidene)-1,2-diaminopropane, and ethylenediaminetetra-acetic acid and its salts, and mixtures thereof, meaning mixtures of any of the metal surface deactivators disclosed in this paragraph.

The optional additional component used with the lubricating compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; friaryl phosphates including triphenyl phosphate, tricresyl phosphate, and trixylenyl phosphate; and mixed alkyl-aryl phosphates including isopropylphenyl phosphate (I PPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad® 620; isopropylated triphenyl phosphates such as those commercially available under the trademarks Durad® 220 and Durad® 110, anisole; 1,4-dimethoxybenzene, 1,4-diethoxybenzene, 1,3,5-trimethoxybenzene, myrcene, alloocimene, limonene (in particular, d-limonene); retinal; α- or β-pinene, menthol; geraniol; farnesol; phytol; Vitamin A; α- or γ-terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane, 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-34(2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide), 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl) succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone, 2-aminobenzophenone;

2-chlorobenzophenone; benzyl phenyl sulfide; diphenyl sulfide; dibenzyl sulfide; ionic liquids; and mixtures and combinations thereof.

The optional additional component used with the lubricating compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F— and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol, 2,2- or 4,4-biphenyl-diols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol), sulfides including; bis(3-methyl-4-hydroxy-5-tertbutylbenzyl)sulfide; bis(3,5-di-tert-butyl-4-hydroxybenzyl) sulfide and mixtures thereof.

In some embodiments, a stabilizer may be a single stabilizing compound as described in detail above. In other embodiments, a stabilizer may be a mixture of two or more of the stabilizing compounds, either from the same class of compounds or from differing classes of compounds, said classes being described in detail above.

In particular, the optional additional component can be a polymerization inhibitor. Polymerization inhibitors can include terpenes or terpenoids, butylated triphenylphosphorothionates, benzophenone and derivatives thereof, terephthalates, phenols, epoxides and combinations of any of these classes. Polymerization inhibitors may include, but are not limited to myrcene, alloocimene, limonene (in particular, d-limonene); retinal; pinene (α or β forms); menthol; geraniol; farnesol; farnesene (α or β forms); phytol; Vitamin A; terpinene (α or γforms); delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane, butylated triphenylphosphorothionate (sold by Ciba under the trademark Irgalube® 232), divinyl terephthalate, diphenylterephthalate, butylatedhydroxy toluene (BHT), tocopherol, hydroquinone, 1,2-propylene oxide, 1,2-butylene oxide, butylphenylglycidy ether, pentylphenylglycidyl ether, hexylphenylglycidyl ether, heptylphenylglycidyl ether, octylphenylglycidyl ether, nonylphenylglycidyl ether, decylphenylglycidyl ether, glycidyl methylphenylether, 1,4-glycidyl phenyl diether, 4-methoxyphenylglycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether, trifluoromethyloxirane, 1,1-bis(trifluoromethyl)oxirane, and combinations thereof.

In some embodiments, certain compounds may act as stabilizer and polymerization inhibitor, thus the overlap of these lists of possible compounds in each class.

The optional additional component, which is used with lubricating compositions of the present invention, may alternatively be a tracer. The tracer may be a single compound or two or more tracer compounds from the same class of compounds or from different classes of compounds. In some embodiments, the tracer is present in the compositions at a total concentration of about 1 part per million by weight (ppm) to about 5000 ppm, based on the weight of the total composition. In other embodiments, the tracer is present at a total concentration of about 10 ppm to about 1000 ppm. In other embodiments, the tracer is present at a total concentration of about 20 ppm to about 500 ppm. In other embodiments, the tracer is present at a total concentration of about 25 ppm to about 500 ppm. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, chlorofluororcarbons (CFCs), hydrofluorochlorocarbons (HCFCs), chlorocarbons, perfluorocarbons, fluoroethers, brominated compounds, iodated compounds, alcohols, aldehydes and ketones, nitrous oxide and combinations thereof. Alternatively, the tracer may be selected from the group consisting of trifluoromethane (HFC-23), dichlorodifluoromethane (CFC-12), chlorodifluoromethane HCFC-22), methyl chloride (R-40), chlorofluoromethane (HCFC-31), fluoroethane (HFC-161), 1,1,-difluoroethane (HFC-152a), 1,1,1-trifluoroethane (HFC-143a), chloropentafluoroethane (CFC-115), 1,2-dichloro-1,1,2,2-tetrafluoroethane (CFC-114), 1,1-dichloro-1,2,2,2-tetrafluoroethane (CFC-114a), 2-chloro-1,1,1,2-tetrafluoroethane (HCFC-124), pentafluoroethane (HFC-125), 1,1,2,2-tetrafluoroethane (HFC-134), 1,1,1,2-tetrafluoroethane (HFC-134a), 1,1,1,3,3,3-hexafluoropropane (HFC-236fa), 1,1,1,2,3,3,3-heptafluoropropane (HFC-227ea), 1,1,1,2,2,3,3-heptafluoropropane (HFC-227ea), 1,1,1,3,3-pentafluoropropane(HFC-245fa), 1,1,1,2,2-pentafluoropropane (HFC-245cb), 1,1,1,2,3-pentafluoropropane (HFC-245eb), 1,1,2,2-tetrafluoropropane (HFC-254cb), 1,1,1,2-tetrafluoropropane (HFC-254eb), 1,1,1-trifluoropropane (HFC-263fb), 1,1-difluoro-2-chloroethylene (HCFC-1122), 2-chloro-1,1,2-trifluoroethylene (CFC-1113), 1,1,1,3,3-pentafluorobutane (HFC-365mfc), 1,1,1,2,3,4,4,5,5,5-decafluoropentane (HFC-43-10mee), 1,1,1,2,2,3,4,5,5,6,6,7,7,7-tetradecafluoroheptane, hexafluorobutadiene, 3,3,3-trifluoropropyne, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons. In other embodiments, the tracer is a blend of at least one CFC and at least one HCFC, HFC, or PFC.

The tracer may be added to the compositions of the present invention in predetermined quantities to allow detection of any dilution, contamination or other alteration of the composition. Additionally, the tracers may allow detection of product that infringes existing patent rights, by identification of the patent owner's product versus competitive infringing product. Further, in one embodiment, the tracer compounds may allow detection of a manufacturing process by which a product is produced, thus, allowing detection of infringement of a patent to specific manufacturing process chemistry.

The additive which may be used with the compositions of the present invention may alternatively be a perfluoropolyether as described in detail in US2007-0284555, incorporated herein by reference.

It will be recognized that certain of the additives referenced above as suitable for the non-refrigerant component have been identified as potential refrigerants. However, in accordance with this invention, when these additives are used, they are not present at an amount that would affect the novel and basic characteristics of the refrigerant mixtures of this invention. Preferably, the refrigerant mixtures and the compositions of this invention containing them, contain no more than about 0.5 weight percent of the refrigerants other than HFC-32 and HFO-1234yf.

EXAMPLES

Example 1

Cooling Performance—Air Conditioning

Cooling performance at typical conditions for air conditioning and heat pump apparatus for compositions of the present invention is determined and displayed in Table 1. Compressor discharge temperatures (T_discharge), average temperature glide (average glide—the average of the temperature glide in the evaporator and the temperature glide in the condenser), cooling capacity (CAP_c), and coefficient of performance (COP—a measure of energy efficiency) are calculated from physical property measurements for the compositions of the present invention at the following specific conditions:

| | |
|---|---|
| Evaporator temperature | 10° C. |
| Condenser temperature | 46.1° C. |
| Amount of superheat | 11.1 K |
| Amount of subcooling | 8.3 K |
| Compressor efficiency | 70% |

TABLE 1

| fluid | T_discharge (° C.) | average glide (K) | CAP_c (kJ/m3) | COP_c |
|---|---|---|---|---|
| 1234yf/HFC-32 (65/35 wt %) | 77.4 | 4.7 | 5230 | 4.594 |
| 1234yf/HFC-32 (31.1/68.9 wt %) | 87.3 | 1.2 | 6512 | 4.526 |
| 1234yf/HFC-32 (78.5/21.5 wt %) | 73.2 | 6.3 | 4547 | 4.672 |

Example 2

Cooling Performance—Medium Temperature Refrigeration

Cooling performance at typical conditions for medium temperature refrigeration apparatus for compositions of the present invention is determined and displayed in Table 2. Compressor discharge temperatures (T_discharge), average temperature glide (average glide—the average of the temperature glide in the evaporator and the temperature glide in the condenser), cooling capacity (CAP_c), and coefficient of performance (COP—a measure of energy efficiency) are calculated from physical property measurements for the compositions of the present invention at the following specific conditions:

| | |
|---|---|
| Evaporator temperature | −7° C. |
| Condenser temperature | 40.0° C. |
| Return temperature | 18° C. |
| Compressor efficiency | 70% |

TABLE 2

| fluid | T_discharge (° C.) | average glide (K) | CAP_c (kJ/m$^3$) | COP_c |
|---|---|---|---|---|
| 1234yf/HFC-32 (65/35 wt %) | 92.2 | 4.7 | 2839 | 2.967 |
| 1234yf/HFC-32 (31.1/68.9 wt %) | 110.7 | 1.1 | 3605 | 2.937 |
| 1234yf/HFC-32 (78.5/21.5 wt %) | 85.1 | 6.1 | 2429 | 2.999 |

Example 3

Cooling Performance—Low Temperature Refrigeration

Cooling performance at typical conditions for low temperature refrigeration apparatus for compositions of the present invention is determined and displayed in Table 3. Compressor discharge temperatures (T_discharge), average temperature glide (average glide—the average of the temperature glide in the evaporator and the temperature glide in the condenser), cooling capacity (CAP_c), and coefficient of performance (COP— a measure of energy efficiency) are calculated from physical property measurements for the compositions of the present invention at the following specific conditions:

| | |
|---|---|
| Evaporator temperature | −35° C. |
| Condenser temperature | 40.0° C. |

-continued

| Return temperature | 10° C. |
|---|---|
| Compressor efficiency | 70% |

TABLE 3

| fluid | T_discharge (° C.) | average glide (K) | CAP_c (kJ/m³) | COP_c |
|---|---|---|---|---|
| 1234yf/HFC-32 (65/35 wt %) | 117.6 | 4.5 | 889.3 | 1.447 |
| 1234yf/HFC-32 (31.1/68.9 wt %) | 152.0 | 1.0 | 1206 | 1.459 |
| 1234yf/HFC-32 (78.5/21.5 wt %) | 104.9 | 5.5 | 728.3 | 1.444 |

Example 4

Refrigerant Lubricant Compositions at Air Conditioning, Medium

Temperature Refrigeration, and Low Temperature Refrigeration Conditions

For each of the R-32/R-1234yf/POE32-3MAF mixtures working kinematic viscosities were calculated for the liquid phase in the oil "sump". Typically, in the refrigeration lubricant industry, modeled VLE and the resultant liquid viscosity are based on limited data where the system is effectively at the bubble point such that the vapor space is very small. This results in the refrigerant blend's composition in the liquid phase to be that of its nominal composition, where the vapor is at a composition that is leaner in the more preferentially soluble component. This is not consistent with the actual state of a refrigerant/lubricant oil mixture in a hermetically sealed compressor, which are typically in use for residential AC and refrigeration systems. In these systems, the ratio of the refrigerant charge to that of the lubricant is much larger such that the circulating refrigerant is essentially at the nominal composition, and the refrigerant fraction in the liquid oil-rich phase is enriched in the more preferentially soluble component. In the case of R-454A, B and C blends, which are mixtures of R-32 and R-1234yf, the oil-rich phase is enriched in R-1234yf and depleted of R-32. This results in a larger than expected actual working viscosity. This is an unexpected consequence that improves the lubricity in POE oils because the expected viscosity, where the refrigerant fraction of the liquid is at the nominal composition, is more dilute with an over estimated concentration of R-32, which is less viscous. In some cases this deviation from expected to actual viscosity is close to a 10% increase.

In tables 4A, 4B and 4C are shown the compositions present in the oil sump when a system is powered off after running with R-454A, R-454B, and R-454C. Both the composition when the nominal refrigerant is considered to be dissolved in the POE and when the composition based on the known preferential 1234yf solubility is used. Additionally, the viscosity is indicated for each 32/1234yf/POE composition demonstrating that the actual composition viscosity is different than for the nominal based on the preferential 1234yf solubility.

In tables 5A, 5B and 5C are shown the compositions present in the oil sump when an air conditioning system is operating at steady state with R-454A, R-454B, and R-454C. Both the composition when the nominal refrigerant is considered to be dissolved in the POE and when the composition based on the known preferential 1234yf solubility is used. Additionally, the viscosity is indicated for each 32/1234yf/POE composition demonstrating that the actual composition viscosity is different than for the nominal based on the preferential 1234yf solubility.

In tables 6A, 6B and 6C are shown the compositions present in the oil sump when a medium temperature refrigeration system is operating at steady state with R-454A, R-454B, and R-454C. Both the composition when the nominal refrigerant is considered to be dissolved in the POE and when the composition based on the known preferential 1234yf solubility is used. Additionally, the viscosity is indicated for each 32/1234yf/POE composition demonstrating that the actual composition viscosity is different than for the nominal based on the preferential 1234yf solubility.

In tables 7A, 7B and 7C are shown the compositions present in the oil sump when a low temperature refrigeration system is operating at steady state with R-454A, R-454B, and R-454C. Both the composition when the nominal refrigerant is considered to be dissolved in the POE and when the composition based on the known preferential 1234yf solubility is used. Additionally, the viscosity is indicated for each 32/1234yf/POE composition demonstrating that the actual composition viscosity is different than for the nominal based on the preferential 1234yf solubility.

TABLE 4A

| Refrigerant/Oil | System Powered OFF | Wt % | Kinematic viscosity of refrigerant/ oil mixture |
|---|---|---|---|
| R-454A Nominal Refrig + oil based on nominal refrigerant composition | 25 C./0.808 MPa 32/1234yf 32/124yf/POE | 77.8 wt % oil in mixture 35/65 7.8/14.4/77.8 | 5.53 cSt |
| New composition due to preferential 1234yf solubility in oil | 32/1234yf | 27.4/72.6 | |
| Refrig + oil based on new composition | 32/1234yf/POE | 6.1/16.1/77.8 | 5.95 cSt |
| | | | 7.59% higher viscosity |

TABLE 4B

| Refrigerant/Oil | System Powered OFF | Wt % | Kinematic viscosity of refrigerant/ oil mixture |
|---|---|---|---|
| R-454B Nominal Refrig + oil based on nominal refrigerant composition | 25 C./1.01 MPa 32/1234yf 32/124yf/POE | w_oil = 80.3 68.9/31.1 13.6/6.1/80.3 | 4.49 cSt |
| New composition due to preferential 1234yf solubility in oil | 32/1234yf | 64.2/35.8 | |

TABLE 4B-continued

| Refrigerant/Oil | System Powered OFF | Wt % | Kinematic viscosity of refrigerant/oil mixture |
|---|---|---|---|
| Refrig + oil based on new composition | 32/1234yf/POE | 12.6/7.1/80.3 | 4.75 cSt |
| | | | 5.79% higher viscosity |

TABLE 4C

| Refrigerant/Oil | System Powered OFF | Wt % | Kinematic viscosity of refrigerant/oil mixture |
|---|---|---|---|
| R-454C Nominal | 25 C./0.689 Mpa 32/1234yf | 78.2 wt % oil in mixture 21.5/78.5 | |
| Refrig + oil based on nominal refrigerant composition | 32/124yf/POE | 4.7/17.1/78.2 | 6.42 cSt |
| New composition due to preferential 1234yf solubility in oil | 32/1234yf | 15.6/84.4 | |
| Refrig + oil based on new composition | 32/1234yf/POE | 3.4/18.4/78.2 | 6.65 cSt |
| | | | 3.58% higher viscosity |

TABLE 5A

| Refrigerant/Oil | AC conditions at Steady State | Wt % | Kinematic viscosity of refrigerant/oil mixture |
|---|---|---|---|
| R-454A Nominal | 23.5 C./0.808 MPa 32/1234yf | 75.8 wt % oil in mixture 35/65 | |
| Refrig + oil based on nominal refrigerant composition | 32/124yf/POE | 8.5/15.7/75.8 | 4.95 cSt |
| New composition due to preferential 1234yf solubility in oil | 32/1234yf | 26.7/73.3 | |
| Refrig + oil based on new composition | 32/1234yf/POE | 6.5/17.7/75.8 | 5.38 cSt |
| | | | 8.69% higher viscosity |

TABLE 5B

| Refrigerant | AC conditions at Steady State | Wt % | Kinematic viscosity of refrigerant/oil mixture |
|---|---|---|---|
| R-454B Nominal | 21.7 C./1.01 MPa 32/1234yf | 76.7 wt % oil in mixture 68.9/31.1 | |
| Refrig + oil based on nominal refrigerant composition | 32/124yf/POE | 16.1/7.2/76.7 | 3.67 cSt |
| New composition due to preferential 1234yf solubility in oil | 32/1234yf | 62.9/37.1 | |

TABLE 5B-continued

| Refrigerant | AC conditions at Steady State | Wt % | Kinematic viscosity of refrigerant/oil mixture |
|---|---|---|---|
| Refrig + oil based on new composition | 32/1234yf/POE | 14.7/8.6/76.7 | 3.95 cSt |
| | | | 7.63% higher viscosity |

TABLE 5C

| Refrigerant | AC conditions at Steady State | Wt % | Kinematic viscosity of refrigerant/oil mixture |
|---|---|---|---|
| R-454C Nominal | 24.1 C./0.689 MPa 32/1234yf | 77.1 wt % oil in mxture 21.5/78.5 | |
| Refrig + oil based on nominal refrigerant composition | 32/124yf/POE | 4.9/18.0/77.1 | 6.05 cSt |
| New composition due to preferential 1234yf solubility in oil | 32/1234yf | 15.4/84.6 | |
| Refrig + oil based on new composition | 32/1234yf/POE | 3.5/19.4/77.1 | 6.28 cSt |
| | | | 3.80% higher viscosity |

TABLE 6A

| Refrigerant/Oil | Medium Temp Ref at Steady State | Wt % | Kinematic viscosity of refrigerant/oil mixture |
|---|---|---|---|
| R-454A Nominal | 18 C./0.465 MPa 32/1234yf | 87.8 wt % oil in mixture 35/65 | |
| Refrig + oil based on nominal refrigerant composition | 32/124yf/POE | 4.3/7.9/87.8 | 15.97 cSt |
| New composition due to preferential 1234yf solubility in oil | 32/1234yf | 30.0/70.0 | |
| Refrig + oil based on new composition | 32/1234yf/POE | 3.7/8.5/87.8 | 16.77 cSt |
| | | | 5.01% higher viscocity |

TABLE 6B

| Refrigerant/Oil | Medium Temp Ref at Steady State | Wt % | Kinematic viscosity of refrigerant/oil mixture |
|---|---|---|---|
| R-454B Nominal | 18 C./0.589 MPa 32/1234yf | 88.6 wt % oil in mixture 68.9/31.1 | 3.71% |
| Refrig + oil based on nominal refrigerant composition | 32/124yf/POE | 7.9/3.5/88.6 | 11.86 cSt |

TABLE 6B-continued

| Refrigerant/Oil | Medium Temp Ref at Steady State | Wt % | Kinematic viscosity of refrigerant/ oil mixture |
|---|---|---|---|
| New composition due to preferential 1234yf solubility in oil | 32/1234yf | 66.0/34.0 | |
| Refrig + oil based on new composition | 32/1234yf/POE | 7.5/3.9/88.6 | 12.30 cSt |
| | | | 3.71% higher viscosity |

TABLE 6C

| Refrigerant/Oil | Medium Temp Ref at Steady State | Wt % | Kinematic viscosity of refrigerant/ oil mixture |
|---|---|---|---|
| R-454C Nominal | 18 C./0.391 MPa 32/1234yf | 88.3 wt % oil in mixture 21.5/78.5 | 2.63% |
| Refrig + oil based on nominal refrigerant composition | 32/124yf/POE | 2.5/9.2/88.3 | 19.03 cSt |
| New composition due to preferential 1234yf solubility in oil | 32/1234yf | 17.7/82.3 | |
| Refrig + oil based on new composition | 32/1234yf/POE | 2.1/9.6/88.3 | 19.53 cSt |
| | | | 2.63% higher viscosity |

TABLE 7A

| Refrigerant/Oil | Low Temp Ref at Steady State | Wt % | Kinematic viscosity of refrigerant/ oil mixture |
|---|---|---|---|
| R-454A Nominal | −10 C./0.155 MPa 32/1234yf | 91.0 wt % oil in mixture 35/65 | |
| Refrig + oil based on nominal refrigerant composition | 32/124yf/POE | 3.2/5.8/91.0 | 82.00 cSt |
| New composition due to preferential 1234yf solubility in oil | 32/1234yf | 28.2/71.8 | |
| Refrig + oil based on new composition | 32/1234yf/POE | 2.5/6.5/91.0 | 89.45 cSt |
| | | | 9.20% higher viscosity |

TABLE 7B

| Refrigerant/Oil | Low Temp Ref at Steady State | Wt % | Kinematic viscosity of refrigerant/ oil mixture |
|---|---|---|---|
| R-454B Nominal | −10 C./0.202 MPa 32/1234yf | 91.7 wt % oil in mixture 68.9/31.1 | 58.31 cSt |
| Refrig + oil based on nominal refrigerant composition | 32/124yf/POE | 5.7/2.6/91.7 | 58.31 cSt |

TABLE 7B-continued

| Refrigerant/Oil | Low Temp Ref at Steady State | Wt % | Kinematic viscosity of refrigerant/ oil mixture |
|---|---|---|---|
| New composition due to preferential 1234yf solubility in oil | 32/1234yf | 63.6/36.4 | |
| Refrig + oil based on new composition | 32/1234yf/POE | 5.3/3.0/91.7 | 62.95 cSt |
| | | | 7.96% higher viscosity |

TABLE 7C

| Refrigerant/Oil | Low Temp Ref at Steady State | Wt % | Kinematic viscosity of refrigerant/ oil mixture |
|---|---|---|---|
| R-454C Nominal | −10 C./0.127 MPa 32/1234yf | 91.5 wt % oil in mixture 21.5/78.5 | |
| Refrig + oil based on nominal refrigerant composition | 32/124yf/POE | 1.8/6.7/91.5 | 105.48 cSt |
| New composition due to preferential 1234yf solubility in oil | 32/1234yf | 16.3/83.7 | |
| Refrig + oil based on new composition | 32/1234yf/POE | 1.4/7.1/91.5 | 111.25 cSt |
| | | | 5.47% higher viscosity |

The results show in every case, 1234yf has preferentially higher solubility than R-32 in the lubricant which is unexpected. This results in the level of 1234yf increasing in the oil phase. Because 1234yf has less impact on reducing the working viscosity of the lubricant than R-32, the resulting viscosity is higher than would be expected if the nominal refrigerant composition was assumed to be dissolved in the lubricant.

Additional Embodiments

Embodiment A1: A lubricating composition comprising:
a) from about 2 to 7 weight percent difluoromethane, about 6 to 18 weight percent 2,3,3,3-tetrafluoropropene, and about 75 to 91 weight percent polyol ester lubricant;
b) from about 5 to 14 weight percent difluoromethane, about 3 to 9 weight percent 2,3,3,3-tetrafluoropropene, and about 76 to 92 weight percent polyol ester lubricant; or
c) from about 1 to 4 weight percent difluoromethane, about 7 to 20 weight percent 2,3,3,3-tetrafluoropropene, and about 77 to 92 weight percent polyol ester lubricant.

Embodiment A2: The composition of Embodiment A1 comprising:
a) from about 2 to 6.5 weight percent difluoromethane, about 6 to 17 weight percent 2,3,3,3-tetrafluoropropene, and about 77 to 91 weight percent polyol ester lubricant;
b) from about 5 to 13 weight percent difluoromethane, about 3 to 8 weight percent 2,3,3,3-tetrafluoropropene, and about 80 to 92 weight percent polyol ester lubricant; or c) from about 2 to 4 weight percent difluoromethane, about 7 to 19 weight percent 2,3,3,3-tetrafluoropropene, and about 78 to 92 weight percent polyol ester lubricant.

Embodiment A3: The composition of any of Embodiments A1 to A2 comprising:
a) from about 3 to 6.5 weight percent difluoromethane, about 8 to 17 weight percent 2,3,3,3-tetrafluoropropene, and about 77 to 88 weight percent polyol ester lubricant;
b) from about 7 to 13 weight percent difluoromethane, about 3 to 8 weight percent 2,3,3,3-tetrafluoropropene, and about 80 to 89 weight percent polyol ester lubricant; or
c) from about 3 to 4 weight percent difluoromethane, about 9 to 19 weight percent 2,3,3,3-tetrafluoropropene, and about 78 to 89 weight percent polyol ester lubricant.

Embodiment A4: The composition of any of Embodiments A1 to A3 comprising:
a) from about 6 to 7 weight percent difluoromethane, about 6 to 18 weight percent 2,3,3,3-tetrafluoropropene, and about 75 to 78 weight percent polyol ester lubricant;
b) from about 7 to 9 weight percent difluoromethane, about 7 to 9 weight percent 2,3,3,3-tetrafluoropropene, and about 76 to 81 weight percent polyol ester lubricant; or
c) from about 1 to 4 weight percent difluoromethane, about 18 to 20 weight percent 2,3,3,3-tetrafluoropropene, and about 77 to 79 weight percent polyol ester lubricant.

Embodiment B1: A refrigeration, air-conditioning or heat pump apparatus comprising an evaporator, a compressor, a condenser, and an expansion device; wherein said compressor comprises a lubricant reservoir containing a lubricating composition comprising polyol ester lubricant, difluoromethane, and 2,3,3,3-tetrafluoropropene.

Embodiment B2: The refrigeration, air-conditioning or heat pump apparatus of Embodiment B1 containing a lubricating composition comprising a composition of any of Embodiments A1 to A4.

Embodiment B3: The apparatus of any of Embodiments B1 to B2, wherein the polyol ester lubricant is obtained by reacting a carboxylic acid with a polyol comprising a neopentyl backbone selected from the group consisting of neopentyl glycol, trimethylol propane, pentaerythritol, dipentaerythritol, and mixtures thereof.

Embodiment B4: The apparatus of any of Embodiments B1 to B3, wherein the polyol ester lubricant is obtained by reacting an alcohol with a carboxylic acid having 2 to 15 carbons.

Embodiment B5: The apparatus of any of Embodiments B1 to B4, wherein the carboxylic acid is linear or branched.

Embodiment B6: The apparatus of any of Embodiments B1 to B5, wherein said polyol ester lubricant has a viscosity of from about 10 to about 200 centistokes at about 40° C.

Embodiment B7: The apparatus of any of Embodiments B1 to B6, wherein said compressor is a rotary compressor, reciprocating compressor, or scroll compressor.

Embodiment B8: The apparatus of any of Embodiments B1 to B7, which is an air conditioning apparatus.

Embodiment B9: The apparatus of any of Embodiments B1 to B8, which is a refrigeration apparatus.

Embodiment B10: The apparatus of any of Embodiments B1 to B9, which is a heat pump apparatus.

Embodiment C1: A method of lubricating a compressor in a refrigeration, air conditioning or heat pump system, said method comprising adding a POE lubricant to the compressor, charging the system with refrigerant and operating the system, wherein said compressor comprises a lubricant reservoir; said refrigerant contains difluoromethane and 2,3,3,3-tetrafluoropropene; and said lubricant reservoir contains POE, difluoromethane and 2,3,3,3-tetrafluoropropene.

Embodiment C2: The method of Embodiment C1, wherein said lubricant reservoir contains a composition of any of Embodiments A1 to A4.

What is claimed is:

1. A refrigeration, air-conditioning or heat pump apparatus comprising an evaporator, a compressor, a condenser, a vapor phase refrigerant blend, and an expansion device; wherein said compressor comprises a lubricant reservoir containing a liquid phase lubricating composition comprising polyol ester lubricant, difluoromethane, and 2,3,3,3-tetrafluoropropene, and said vapor phase refrigerant blend is selected from the group consisting of:
   35 wt % difluoromethane and 65 wt % 2,3,3,3-tetrafluoropropene;
   68.9 wt % difluoromethane and 31.1 wt % 2,3,3,3-tetrafluoropropene; and
   21.5 wt % difluoromethane and 78.5 wt % 2,3,3,3-tetrafluoropropene.

2. The apparatus of claim 1, wherein the polyol ester lubricant is obtained by reacting a carboxylic acid with a polyol comprising a neopentyl backbone selected from the group consisting of neopentyl glycol, trimethylol propane, pentaerythritol, dipentaerythritol, and mixtures thereof.

3. The apparatus of claim 1, wherein the polyol ester lubricant is obtained by reacting an alcohol with a carboxylic acid having 2 to 15 carbons.

4. The apparatus of claim 3, wherein the carboxylic acid is linear or branched.

5. The apparatus of claim 2, wherein said polyol ester lubricant has a viscosity of from about 10 to about 200 centistokes at about 40° C.

6. The apparatus of claim 1, wherein said compressor is a rotary compressor, reciprocating compressor, or scroll compressor.

7. The apparatus of claim 1, which is an air conditioning apparatus.

8. The apparatus of claim 1, which is a refrigeration apparatus.

9. The apparatus of claim 1, which is a heat pump apparatus.

10. The apparatus of claim 1, wherein said liquid phase lubricating composition comprises:
a. from about 2 to 7 weight percent difluoromethane, about 6 to 18 weight percent 2,3,3,3-tetrafluoropropene, and about 75 to 91 weight percent polyol ester lubricant;
b. from about 5 to 14 weight percent difluoromethane, about 3 to 9 weight percent 2,3,3,3-tetrafluoropropene, and about 76 to 92 weight percent polyol ester lubricant; or
c. from about 1 to 4 weight percent difluoromethane, about 7 to 20 weight percent 2,3,3,3-tetrafluoropropene, and about 77 to 92 weight percent polyol ester lubricant.

11. The apparatus of claim 10, wherein said liquid phase lubricating composition comprises:
 a. from about 2 to 6.5 weight percent difluoromethane, about 6 to 17 weight percent 2,3,3,3-tetrafluoropropene, and about 77 to 91 weight percent polyol ester lubricant;
 b. from about 5 to 13 weight percent difluoromethane, about 3 to 8 weight percent 2,3,3,3-tetrafluoropropene, and about 80 to 92 weight percent polyol ester lubricant; or
 c. from about 2 to 4 weight percent difluoromethane, about 7 to 19 weight percent 2,3,3,3-tetrafluoropropene, and about 78 to 92 weight percent polyol ester lubricant.

12. The apparatus of claim 10, wherein said liquid phase lubricating composition comprises:
 a. from about 3 to 6.5 weight percent difluoromethane, about 8 to 17 weight percent 2,3,3,3-tetrafluoropropene, and about 77 to 88 weight percent polyol ester lubricant;
 b. from about 7 to 13 weight percent difluoromethane, about 3 to 8 weight percent 2,3,3,3-tetrafluoropropene, and about 80 to 89 weight percent polyol ester lubricant; or
 c. from about 3 to 4 weight percent difluoromethane, about 9 to 19 weight percent 2,3,3,3-tetrafluoropropene, and about 78 to 89 weight percent polyol ester lubricant.

13. The apparatus of claim 10, wherein said liquid phase lubricating composition comprises:
 a. from about 6 to 7 weight percent difluoromethane, about 6 to 18 weight percent 2,3,3,3-tetrafluoropropene, and about 75 to 78 weight percent polyol ester lubricant;
 b. from about 7 to 9 weight percent difluoromethane, about 7 to 9 weight percent 2,3,3,3-tetrafluoropropene, and about 76 to 81 weight percent polyol ester lubricant; or
 c. from about 1 to 4 weight percent difluoromethane, about 18 to 20 weight percent 2,3,3,3-tetrafluoropropene, and about 77 to 79 weight percent polyol ester lubricant.

14. A method of lubricating a compressor in a refrigeration, air conditioning or heat pump system, said method comprising adding a POE lubricant to the compressor, charging the system with refrigerant blend and operating the system, wherein:
 said compressor comprises a lubricant reservoir containing a liquid phase lubricating composition comprising POE lubricant, difluoromethane, and 2,3,3,3-tetrafluoropropene; and
 said refrigerant blend is selected from the group consisting of: 35 wt % difluoromethane and 65 wt % 2,3,3,3-tetrafluoropropene, 68.9 wt % difluoromethane and 31.1 wt % 2,3,3,3-tetrafluoropropene, and 21.5 wt % difluoromethane and 78.5 wt % 2,3,3.3-tetrafluoropropene.

* * * * *